Nov. 24, 1925.  1,562,887
J. G. JACKSON
ELECTRIC STORAGE BATTERY
Filed Feb. 4, 1924
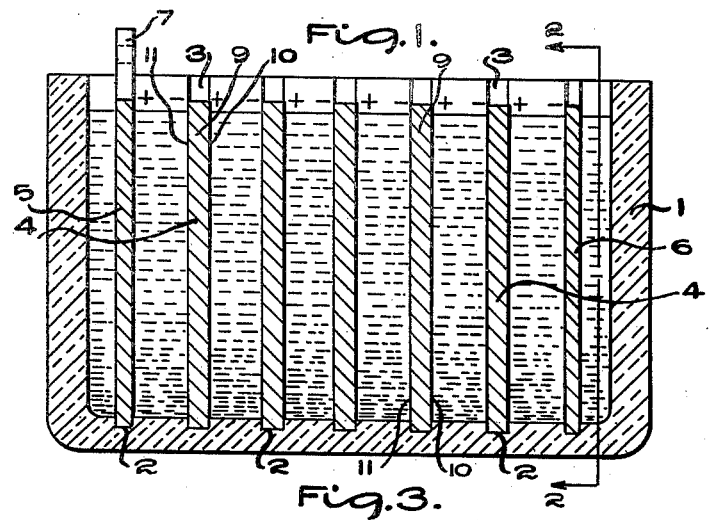
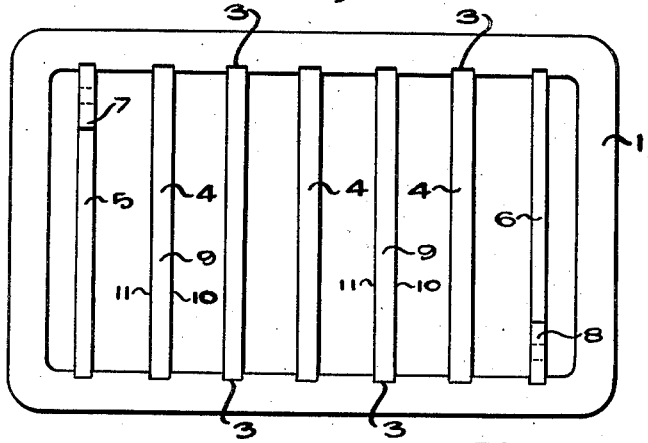
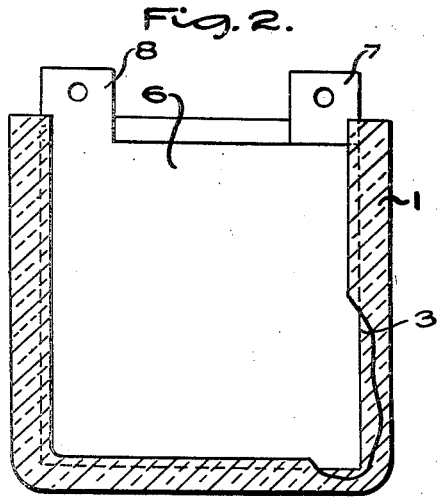
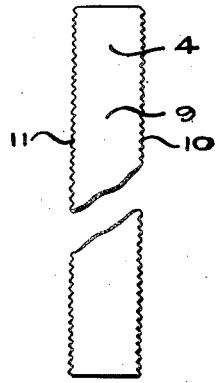
INVENTOR
JOHN G. JACKSON
ATTYS Patented Nov. 24, 1925.

1,562,887

UNITED STATES PATENT OFFICE

JOHN GRANT JACKSON, OF CHATHAM, ONTARIO, CANADA.

ELECTRIC STORAGE BATTERY.

Application filed February 4, 1924. Serial No. 690,531.

*To all whom it may concern:*

Be it known that I, JOHN GRANT JACKSON, a subject of the King of Great Britain, and a resident of the city of Chatham, in the county of Kent, in the Province of Ontario, Canada, have invented certain new and useful Improvements in Electric Storage Batteries, of which the following is the specification.

My invention relates to improvements in electric storage batteries and the object of the invention is to simplify the construction of multicellular batteries.

A further object is to devise a battery in which the individual insulating containers are dispensed with.

A still further object is to devise a bipolar electrode in which both the positive and negative plates shall be combined in one unit.

Another object is to devise a battery in which the bipolar electrodes constitute cell divisions between the successive cells of a multicellular battery, and yet another object is to devise a battery in which the metallic connections between the plates shall be dispensed with.

My invention consists of an electric storage battery constructed and arranged all as hereinafter more particularly described and illustrated in the accompanying drawing in which:

Fig. 1 represents a vertical longitudinal section through a battery constructed according to my invention.

Fig. 2 is a vertical cross section through the line 2—2 Figure 1.

Fig. 3 is a plan view, and

Fig. 4 is an enlarged vertical section through one of the plates constituting a double polarity electrode.

Like characters of reference indicate corresponding parts in the different views.

1 is the container constructed of any suitable insulating materials and provided with a plurality of slots 2 in the bottom thereof, said slots communicating with similarly constituted slots 3 in the interior of the side walls of the container. 4 are plates inserted into the slots 2 and 3 and sealed therein so as to constitute cellular divisions in the container. 5 and 6 are additional plates similarly inserted into the container at each end thereof and provided with the upwardly extending lugs 7 and 8 to which external electrical attachment may be made.

The plates 4 consist of a central, preferably solid, conducting wall 9 and the opposite faces 10 and 11 which are treated with any of the accepted and well-known methods for forming plate surfaces, such as by finely dividing the surfaces and forming positive or negative plate surfaces, as in the Planté method of battery plate construction. In the present instance the surface 10 constitutes the positive surface and the surface 11 the negative surface. Thus a double polarity electrode is constituted in each single plate.

Assuming that the plates 4, 5 and 6 are constructed of lead and the electrolyte consists of sulphuric acid it will be seen on reference to Figure 1 of the drawing that provided the plate 5 is a positive plate the surface 11 of the first plate 4 will constitute the negative electrode, being connected by the central wall 9 with the opposite surface 10 which becomes a positive electrode, and thus every left hand surface 11 is a negative electrode and each right hand surface 10 is a positive electrode, the plate 6 being a negative plate.

Although I have described the surface of the plates 4 as being constructed by the Planté method it is to be understood that such plates could with equal facility be constructed by the pasted method, the only limitation being that the central wall 9 must not be porous to the electrolyte.

Although I have described my plates as being constructed of lead in a sulphuric acid electrolyte, any other suitable plate forming material in conjunction with the corresponding suitable electrolyte may be used.

In sealing my plates 4 into the slots 2 and 3 in the insulating container I may use any compound that will resist the action of the electrolyte or press the plates into the slots so that a tight joint is effected.

From the above description it will be seen that I have devised a multicellular storage battery in which it will not be necessary to use individual insulating cell containers for each cell owing to my plates 4 constituting the cell divisions and being of double polarity, the external metallic connections are dispensed with.

Further by my construction I cut down the number of plates, with the exception of the end cells, to one-half those necessary in the standard multicellular battery of equivalent voltage.

What I claim as my invention is:

In a multicellular electric storage battery, a single container of insulating material having a plurality of spaced apart slots in the side walls, the bottoms of the slots joined by slots in the bottom, a bipolar electrode plate inserted into each series of slots and sealed therein, said plate having positive and negative surfaces formed upon the opposed faces thereof and a conducting inactive substantially nonporous separating wall constituted between the positive and negative surfaces of the plate.

JOHN GRANT JACKSON.